June 19, 1962     L. G. SIMJIAN     3,039,582
SUBSCRIBER CONTROLLED APPARATUS
Filed April 9, 1959     7 Sheets-Sheet 1

INVENTOR.
LUTHER G. SIMJIAN
BY
AGENT.

June 19, 1962  L. G. SIMJIAN  3,039,582
SUBSCRIBER CONTROLLED APPARATUS
Filed April 9, 1959  7 Sheets-Sheet 2
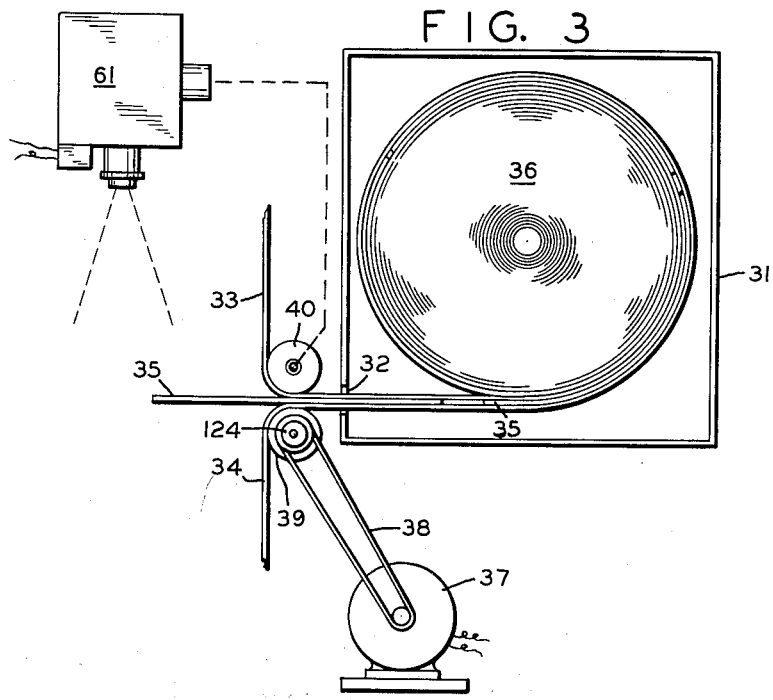
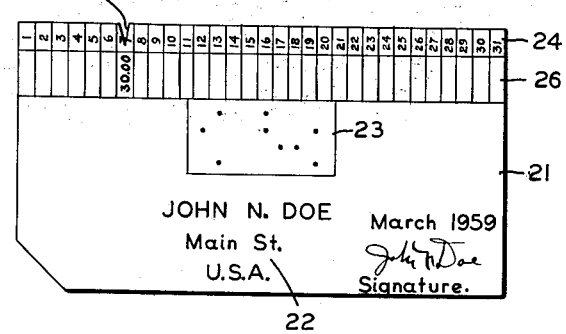
INVENTOR.
LUTHER G. SIMJIAN
BY
AGENT.

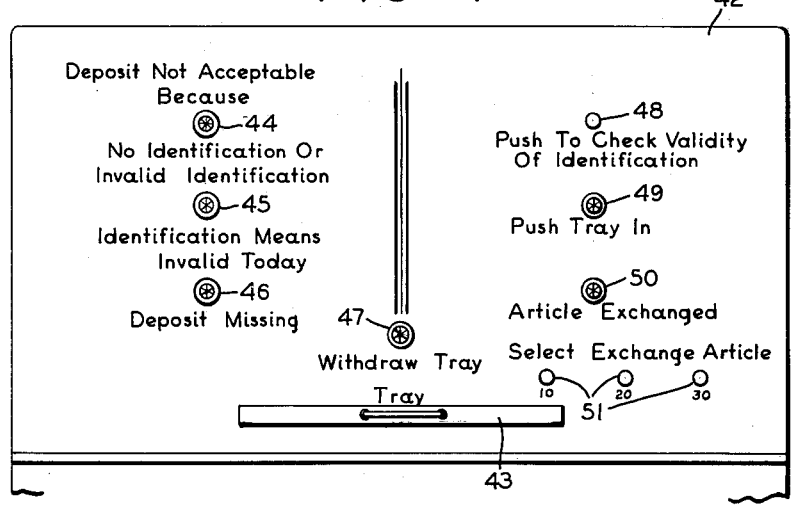
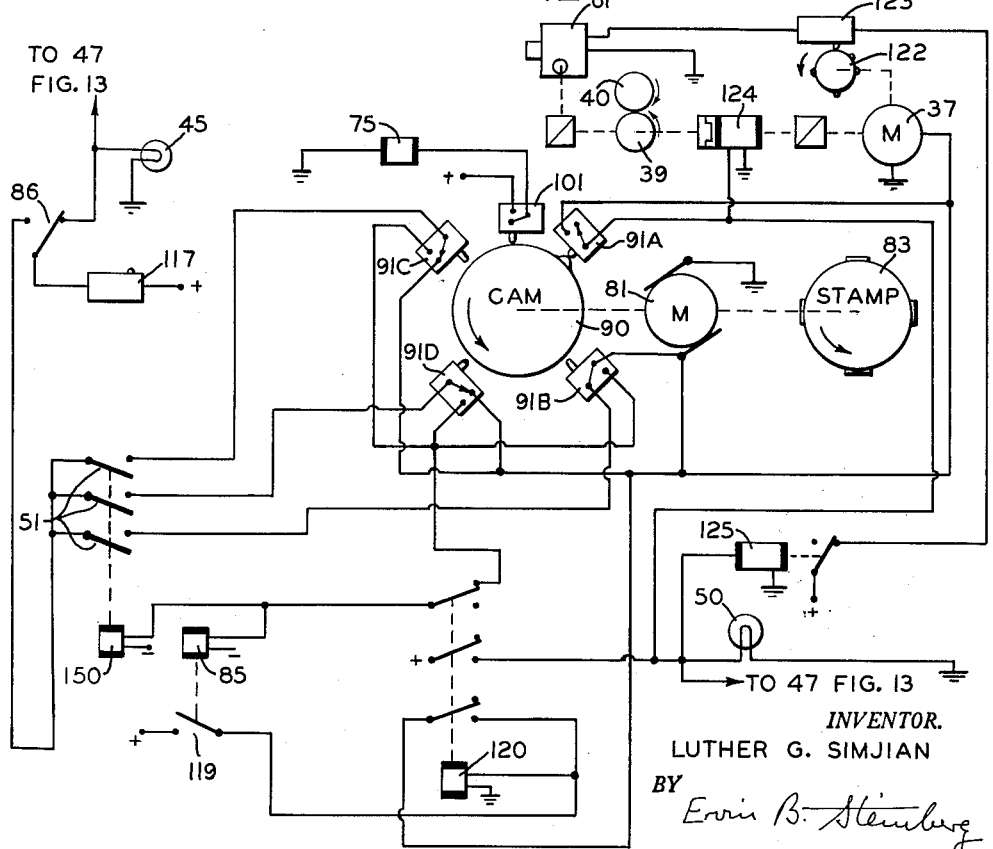

June 19, 1962 L. G. SIMJIAN 3,039,582
SUBSCRIBER CONTROLLED APPARATUS
Filed April 9, 1959 7 Sheets-Sheet 4

INVENTOR.
LUTHER G. SIMJIAN
BY
Ervin B. Steinberg
AGENT.

June 19, 1962   L. G. SIMJIAN   3,039,582
SUBSCRIBER CONTROLLED APPARATUS
Filed April 9, 1959   7 Sheets-Sheet 5

INVENTOR.
LUTHER G. SIMJIAN
BY
AGENT.

June 19, 1962  L. G. SIMJIAN  3,039,582
SUBSCRIBER CONTROLLED APPARATUS
Filed April 9, 1959 7 Sheets-Sheet 6

INVENTOR.
LUTHER G. SIMJIAN
BY
Ervin B. Steinberg
AGENT.

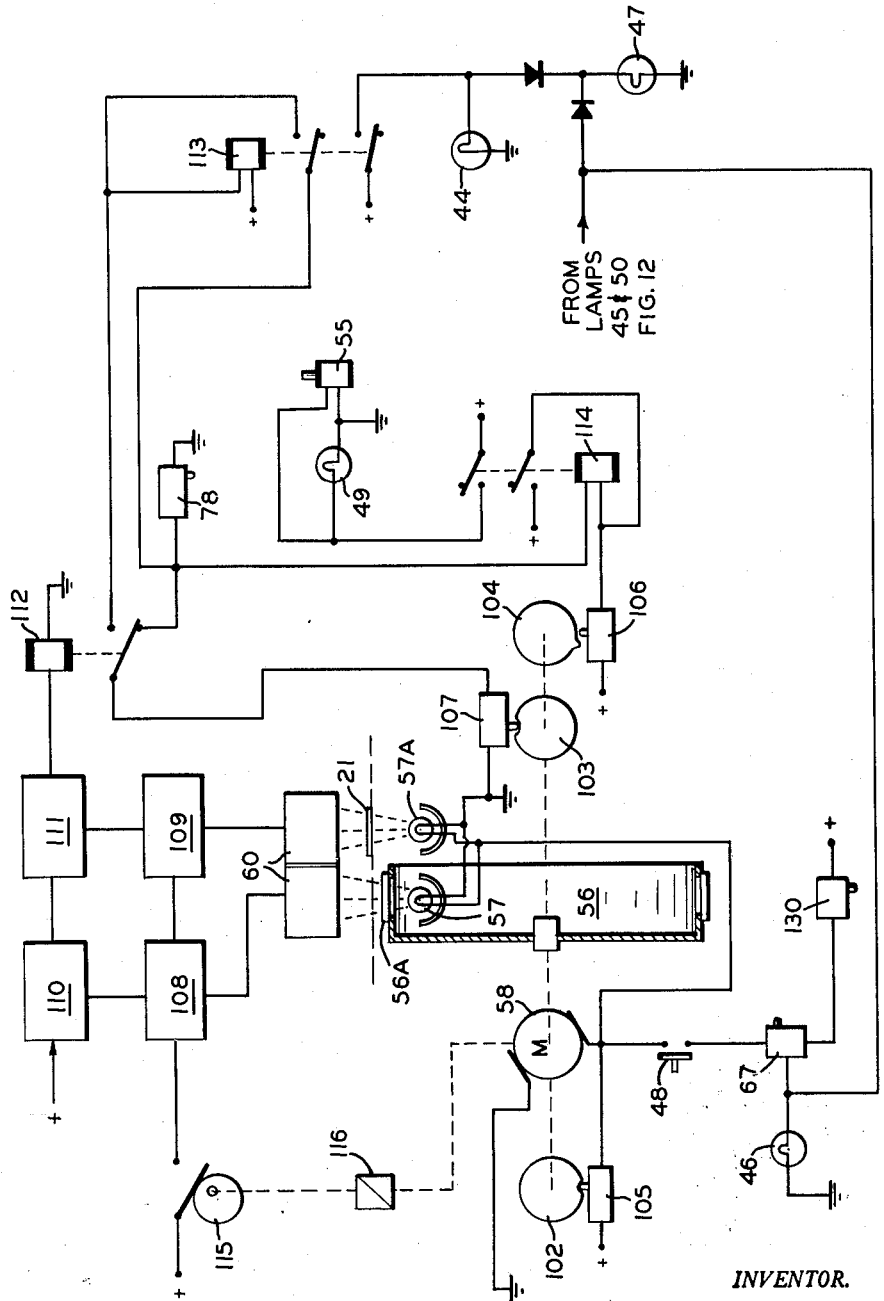

United States Patent Office 3,039,582
Patented June 19, 1962

3,039,582
SUBSCRIBER CONTROLLED APPARATUS
Luther G. Simjian, Greenwich, Conn., assignor to Universal Match Corporation, Ferguson, Mo., a corporation of Delaware
Filed Apr. 9, 1959, Ser. No. 805,324
15 Claims. (Cl. 194—4)

This invention in general has reference to a subscriber controlled apparatus and, more specifically, has reference to an apparatus which is rendered operative by coded subscriber identification means embodying conditional validity information and whereby the validity information is modified by the apparatus after each use.

More particularly, the instant invention concerns an apparatus which is caused to be operative upon insertion of subscriber identification means, the identification means being provided with code means identifying the subscriber and establishing validity of the identification means during a pre-determined period of time. Sensing means within the apparatus sense the validity of the identification means, that is, validity as it pertains to the subscriber and as it concerns the period of time during which the apparatus is used. When validity of the identification means has been established, the apparatus is rendered operative, for instance, to accept a deposit and to dispense an exchange article in return.

One of the salient features of the instant invention relates to means coacting with the apparatus for modifying the code information on the identification means once this means has been used in conjunction with the apparatus in order to render the identification means invalid for excessive or repeated use within the same period of time. By virtue of this arrangement the privileges accorded to a subscriber are restricted to a single or to prescribed number of transactions during a specified period of time which may comprise, for instance, a day, a week or a similar interval. The identification means will be valid, however, during the next succeeding period of time.

A further important feature of the instant apparatus concerns the provision of a receptacle within the apparatus which is equipped with data similar to data on the identification means identifying the subscriber. Sensing means disposed within the apparatus check the data in the receptacle and on the identification means in order to accept or reject the subscriber thereby assuring operation of the apparatus only for such subscribers whose privileges have not been cancelled or suspended.

A further prominent feature of this invention resides in the fact that the instant arrangement may be expanded to provide a plurality of identical apparatus each of which can be rendered operative by a single identification means under the subscriber's control. As soon as the identification means has been used in one of the machines, further use thereof in conjunction with any of the other machines is restricted.

By providing an identification means which is coded with respect to the subscriber and the period of use, the apparatus described hereafter is well adapted for such applications as cashing of checks, that is, accepting a check for deposit and dispensing in exchange therefor money in pre-determined amounts, issuing of articles of value against credit, etc. Subsequent to its operation in combination with the apparatus, the identification means belonging to the subscriber becomes invalidated for use within the same period of time, thus causing the subscriber's privilege to be restricted and the resulting risk to the proprietor of the apparatus to become limited.

Within the apparatus there may be arranged marking means which impress upon the identifying means data concerning the transaction, thus providing the subscriber with a permanent record of the transaction.

Finally, image recording means disposed within the apparatus cause a permanent record to be made of the deposit and/or of the exchange article to furnish proof as to acceptance of the deposit and delivery of the exchange article.

The above is a general outline and description of the present apparatus, its precise purpose, important and novel features becoming more evident from the ensuing description.

One of the objects of this invention is the provision of a new and improved subscriber controlled apparatus.

Another object of this invention is the provision of a subscriber controlled apparatus which is rendered operative by coded subscriber identification means.

Another object of this invention is to provide a subscriber controlled apparatus using periodically changing subscriber identifying means which are coded to identify the subscriber, and coded with respect to the time during which these identification means are valid.

Another object of this invention is to provide an apparatus rendered operative upon insertion of a subscriber identification means whereby sensing means disposed within the apparatus check the validity of the identification means as it applies to the identity of the subscriber and to the period of time.

A further object of this invention is the provision of a subscriber controlled apparatus requiring the subscriber to present identification means which when so utilized are rendered invalid for subsequent use within the same period of time.

A further and other object of this invention is the provision of a subscriber controlled apparatus rendered operative by identification means normally in the possession of the subscriber, the apparatus becoming actuated upon sensing means establishing the validity of the identification means and being adapted to accept a deposit for storage therein and to dispense an exchange article, and wherein still further, the subscriber identification means is rendered invalid for recurring use within the same specified period of time.

A further and still other object of this invention is the provision of a subscriber controlled apparatus operating in combination with subscriber identification means, the apparatus being adapted to receive an article for deposit and dispense an exchange article to the subscriber, the apparatus including means for recording an image of the deposit and/or of the exchange article.

In one form of its embodiment, the subscriber controlled apparatus comprises in combination a subscriber identification means which is normally disposed outside the apparatus and which is provided with code means. Receiving means disposed on the apparatus are adapted to receive from the subscriber the identification means and insert them into the apparatus where sensing means check the validity of the identification means. Storage means also disposed within the apparatus release an article from storage upon the sensing means having established the validity of the subscriber's identification means. Finally, means within the apparatus render the identification means invalid for subsequent use in combination with the apparatus during the same period of time.

In a further embodiment of this invention the subscriber controlled apparatus comprises the combination of a subscriber identification means normally disposed outside of the apparatus which is provided with a first code means identifying the subscriber and a second code means establishing validity of the identification means for a specified period of time. Receiving means disposed on the apparatus are adapted to receive from the subscriber the identification means and transfer them to sensing means to check the validity of the first and second code means when the identification means is within the apparatus. The apparatus is rendered operative in response to the sensing means having established the validity of the first and second code means. Further means within the apparatus modify the second code means in response to the apparatus having been rendered operative so as to prevent recurrent use of identification means with the same or similar apparatus during the identical period of time.

Still further and other objects of this invention, together with additional embodiments thereof will be apparent by reference to the following description taken in conjunction with the accompanying drawings in which:

FIGURE 2 is a plan view of a typical identification means;

FIGURE 3 is a plan view of the dispensing device for releasing exchange articles from a magazine and showing articles being ejected;

FIGURE 4 is a view at the front panel of the apparatus as seen by the subscriber;

FIGURE 12 is a schematic electrical circuit diagram of certain portions of the apparatus, and FIGURE 13 is a schematic electrical circuit diagram of the remaining portions of the apparatus.

Figure 1:
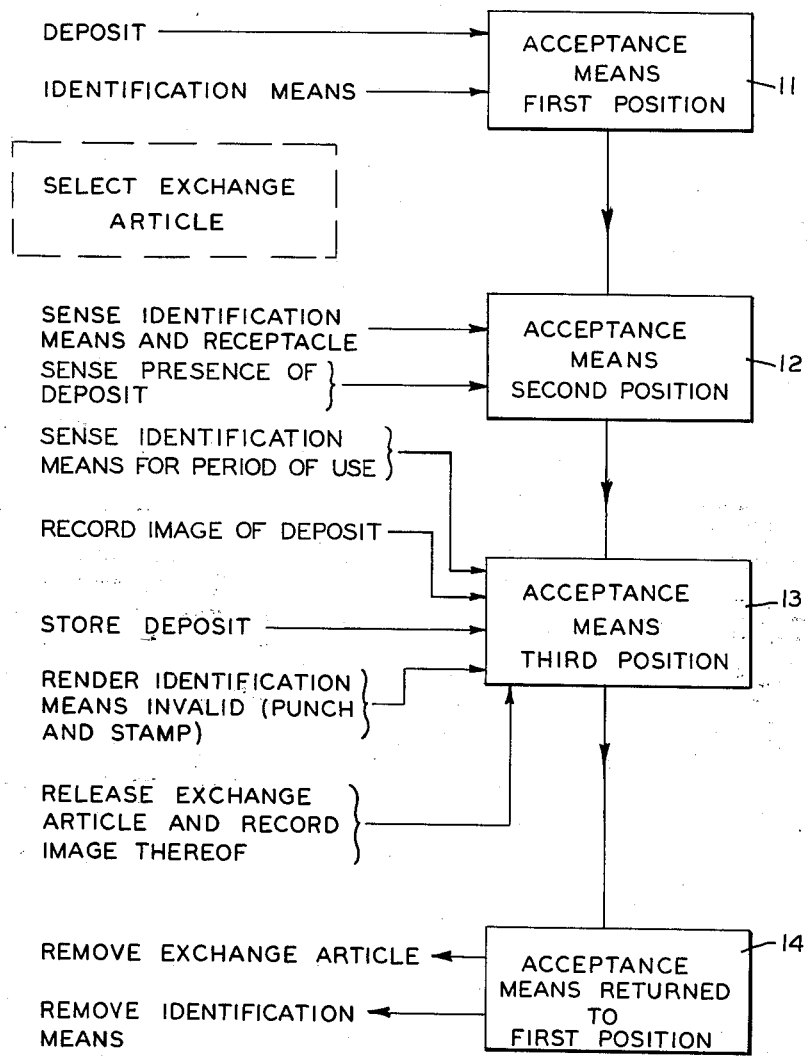
FIGURE 1 is a block diagram explaining the operation of the apparatus in a typical and preferred embodiment.

Referring now to the figures, and FIGURE 1 in particular, a typical embodiment and preferred operation of the instant apparatus is described. It will be apparent that several modifications are possible without deviating from the general scope of the invention. Numeral 11 identifies a block representing the condition when the acceptance means, such as a slidable tray, is in its first position, being accessible to the depositor or subscriber and in this condition being fully extended out of the apparatus. When in this position, the acceptance means receives a deposit to be stored within the apparatus and receives further a suitable identification means normally in the possession of the subscriber. The identification means, if found valid, will render the apparatus operable. Also, the subscriber by proper controls at the front panel of the apparatus selects the exchange article to be returned to him in exchange for the deposit, provided that such a selection is included as a feature of the apparatus.

After the above operations have been accomplished, the acceptance means is caused to assume a second position, numeral 12, which usually comprises a first station within the apparatus. Sensing means within the apparatus are caused to establish the validity of the identification means particularly as such validity pertains to the identity of the depositor. This checking or verification of the subscriber is accomplished by providing within the apparatus a receptacle which contains coded information of depositors. Suitable sensing means and controls associated therewith compare the data in the receptacle with certain data on the identification means thereby establishing the validity of the subscriber. It is possible, therefore, to exclude at this station a subscriber whose privileges have temporarily been supended. Other sensing means establish that there is a deposit on the acceptance means, having been placed there at the first station.

Upon moving the acceptance means to a third position, numeral 13, further sensing means sense the identification means with respect to validity as it concerns the period of use. In particular, the identification means is provided with coded information so as to restrict repeated use of the apparatus within any established time interval by any one subscriber. If the "period of use" code is still valid, the apparatus will be rendered operative. If the code is invalid, the apparatus ceases further operation. Assuming that the identification means is found valid, next, recording means within the apparatus record an image of the deposit to provide a permanent record of the deposit. Subsequently, the deposit is transferred to a storage receptacle of the apparatus and the identification means is rendered invalid for further use within the same period of time by punching or other suitable cancelling means. Moreover, stamping means may be employed to imprint on the identification means the date of use, data concerning the exchange article or other information as may be desirable. Finally, an exchange article is released from a magazine within the apparatus and an image of this article is recorded by the recording means of the apparatus as the article passes from the magazine to a new position which will be rendered accessible to the subscriber.

Lastly, the acceptance means is returned to the first position, numeral 14, where the exchange article can be removed by the subscriber and where the subscriber also retakes possession of the identification means.

It will be obvious that the apparatus contains such locking means as are necessary to suitably protect the subscriber and proprietor of the apparatus. Moreover, the apparatus may readily be modified to interchange certain sequences of operation, eliminate or add other features as will be apparent from the further detailed description.

FIGURE 2 is a plan view of a typical identification means which is periodically issued to a subscriber. The identification means in a typical embodiment comprises a card 21 made of suitable material, for instance tabulating card stock, stating the name of the subscriber, numeral 22, and containing the same or similar information as to the subscriber's identity in the form of coded information within a suitable space 23. This code comprises a plurality of columnar perforations similar to the usual tabulating type code or binary code. Other appropriate type of coding may be substituted. The identification means at one side carries also a marginal strip 24 which in the example illustrated, is divided into 31 divisions, denoting one division for each day of a thirty-one-day month. A notching, numeral 25, indicates that the identification means was used on the particular day. Sensing means provided within the apparatus are adapted to sense the presence or absence of such notchings thereby establishing whether the identification is valid for the prevailing time interval. If a notching is present, it will signify that the subscriber has used his identification means during the particular period and the apparatus will not be rendered operative in conjunction with the same identification means until a new time period has been established. A further space 26 on the identification means is adapted to be engaged by marking or printing means within the apparatus to imprint suitable information concerning the exchange article such as "30.00", indicating the issuance of 30.00 dollars opposite marginal notching 25.

FIGURE 3 shows the exchange article dispensing device which comprises broadly enclosure 31 having at one end thereof an aperture 32 through which passes a set of strips of material 33 and 34. The strips confine therebetween an exchange article 35 which is rendered available to the subscriber. Strips 33 and 34 may comprise, for example, paper tapes, confining in a typical example, money bills, for instance 10.00 dollar bills, which are spaced in a single array one from the other. Enclosure 31 serves, therefore, as a magazine which holds a roll 36 of strips 33 and 34, and exchange article 35. A motor 37 drives by means of belt 38 an electromagnetic clutch 124 which via roller 39 and opposing idler roller 40 advances the strips. Depending upon the length of operation of motor 37 during each cycle of actuation, one or more articles 35 are dispensed from the apparatus and magazine 31, respectively. It will be apparent that magazine 31 must be loaded periodically with suitable rolls 36 in order to maintain the apparatus operative. An image recording means 61 is disposed to record an image of the articles as they are ejected from the magazine. The recording means in the present embodiment is an electrically operated camera wherein the recording film is driven by and in synchronism with rollers 39 and 40.

FIGURE 4 is a view of a typical front panel as presented to the subscriber. Front panel 42 contains a tray 43 which is arranged for sliding motion in and out of the apparatus and the panel, respectively. There is disposed on the panel a number of controls and indicating lights, such as indicating lamp 44 which will become energized when no identification means has been inserted into the apparatus or when the identification means is invalid. Lamp 45 when energized will indicate that the identification means is invalid today, denoting that the subscriber has exhausted his privileges during the prevailing time interval. Lamp 46 will be energized when the subscriber has failed to supply a deposit in exchange for which an article is sought from the apparatus. Energizing of lamp 47 indicates that all operations have been performed and that the subscriber is to withdraw tray 43 from the apparatus to receive the exchange article and to retake possession of the identification means. Lamp 47 will be energized also whenever lamps 44, 45 and 46 are lighted. Push button 48 is provided to cause sensing means within the apparatus to become operative for sensing the validity of the identification means, specifically to establish validity as it pertains to the identity of the subscriber. Lamp 49 requests the subscriber to push tray 43 inward, and lamp 50 together with lamp 47 inform the subscriber that the exchange article has been recorded and that the tray should be moved outward of the apparatus. Push buttons 51 provide the subscriber with an opportunity to select the exchange article, for instance, to select a cash return of 10.00, 20.00 or 30.00 dollars, respectively. As has been explained, by providing for example $10.00 bills, motor 37 in FIGURE 3 can be operated for the necessary duration to expel varying amounts in increments of $10.00.

Figure 5:
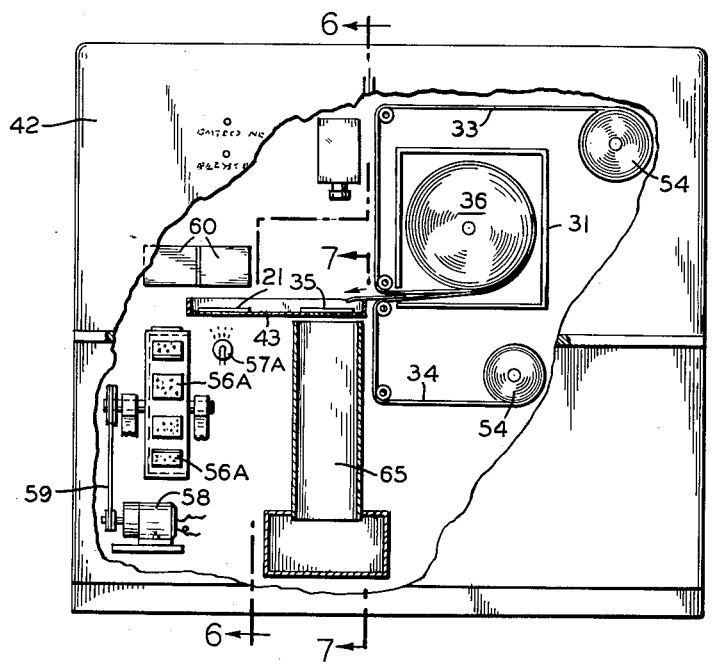
FIGURE 5 is a front view of the apparatus partly sectioned with the front wall partially broken away.
Figure 6:
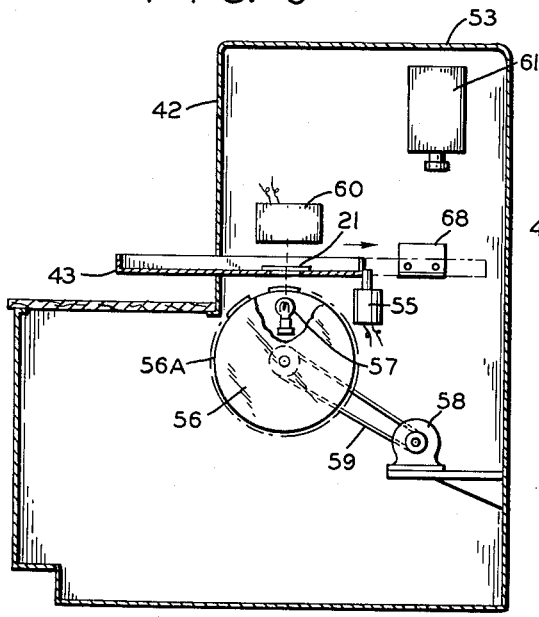
FIGURE 6 is a sectional view of FIGURE 5 taken along lines 6—6.
Figure 7:
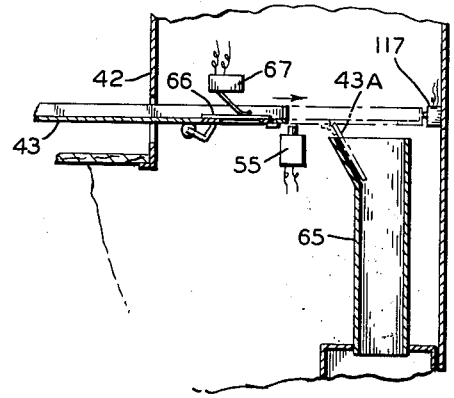
FIGURE 7 is a sectional view of FIGURE 5 taken along lines 7—7.

FIGURES 5, 6 and 7 show the general arrangement and disposition of some of the components which render the apparatus operative. The entire apparatus is contained within an enclosure 53 which includes front panel 42 and tray 43 disposed for slidable motion in and out of the apparatus. The tray is shown as having received identification means 21, FIGURES 5 and 6, and is receiving the exchange article 35, see FIGURE 5. The exchange article 35 originates at roll 36 within enclosure 31 as previously described in connection with FIGURE 3. The unwound tapes 33 and 34 are gathered on a pair of take up rollers 54.

As described in conjunction with FIGURE 1, when the tray 43 is fully withdrawn from the apparatus, i.e. outermost position, the subscriber places on the left side of the tray the identification means and on the right side a deposit, for instance, a check.

The tray then is pushed inward to its second position as shown by the position indicated in FIGURE 6. A solenoid actuated stop 55 serves as temporary rear stop for the tray. When the tray is in this second position, sensing means establish the validity of the subscriber which arrangement briefly comprises the following elements. Rotatably mounted receptacle 56 has mounted on its circumference code means 56A which are similar in appearance and position to code means 23 provided on the identification means 21, FIGURE 2. Receptacle 56 contains, however, only the codes of those subscribers whose privileges have either been cancelled or temporarily have been suspended while identification means 21 is still in circulation. The individual coded cards or coded "tags" on the circumference of receptacle 56 are provided with identical perforations as those which can be found on the identification means. Identification means 21 is placed on the tray, its position being fixed in such a manner that coded space 23 of the identification means becomes aligned horizontally with respect to the uppermost code means 56A of receptacle 56. Illumination means 57 disposed within the receptacle and illumination means 57A disposed underneath the identification means are energized and receptacle 56 is rotated by motor 58 via driving belt 59 to cause coded tags 56A to come sequentially into horizontal alignment with the coded space 23 of identification means 21. In the event that there is at some moment coincidence between the apertures while the receptacle rotates, a two-section photoelectric means 60 disposed above the identification means and receptacle respectively, receives a signal to prevent further operation of the apparatus, thus signifying that the subscriber is not acceptable.

In this manner, each identification means when used by the subscriber is initially compared with respect to data maintained on receptacle 56 to establish whether the subscriber is in good standing. The contents of receptacle 56 can be changed readily, for instance daily, and may be equipped with new tags 56A, or tags may be removed as may be required to provide for inclusion or exclusion of subscribers.

Subsequently, tray 43 is advanced to the third position as shown in FIGURE 5 and indicated by dashed lines in FIGURE 6. In this position the deposit now is in view of the image recording means 61 previously described in FIGURE 3 which is actuated to provide a record of the nature of the deposit. Following the recording, the deposit placed on the tray by the subscriber is transferred to a storage receptacle 65 by releasing a hingedly mounted portion 43A of tray 43. Portion 43A is adapted to rotate downwardly causing deposit 66 to fall by gravity or other suitable forcing means into a channel 65 which forms a part of the storage receptacle, see FIGURE 7. The presence of deposit 66 on the tray 43 is sensed by switch 67. Numeral 68 visible in FIGURE 6 refers to stamping and validity cancelling means which operate in conjunction with the identification means 21 described later.

Figure 9:
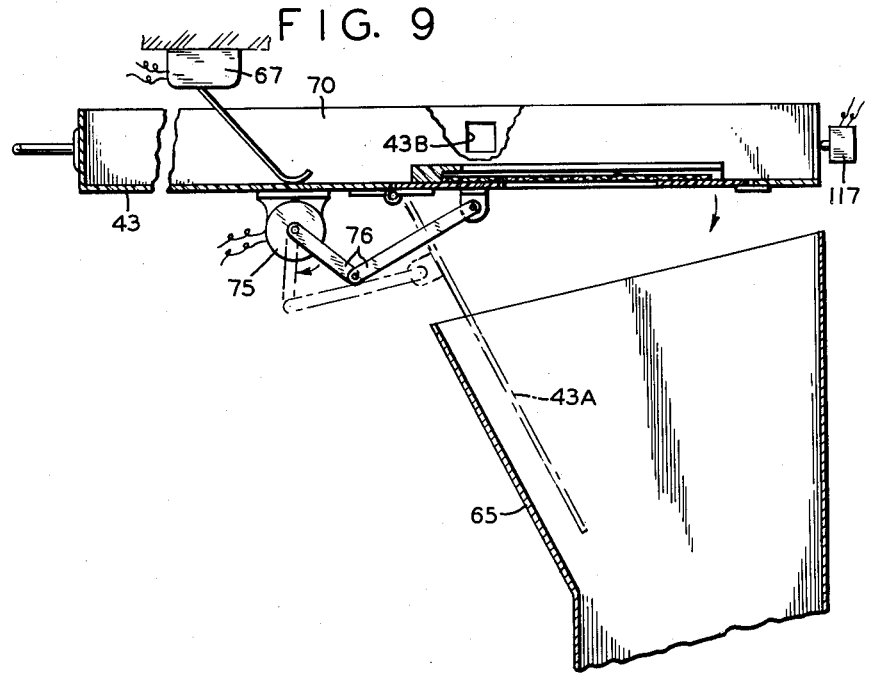
FIGURE 9 is a sectional view of the tray shown in FIGURE 8 along lines 9—9.
Figure 8:
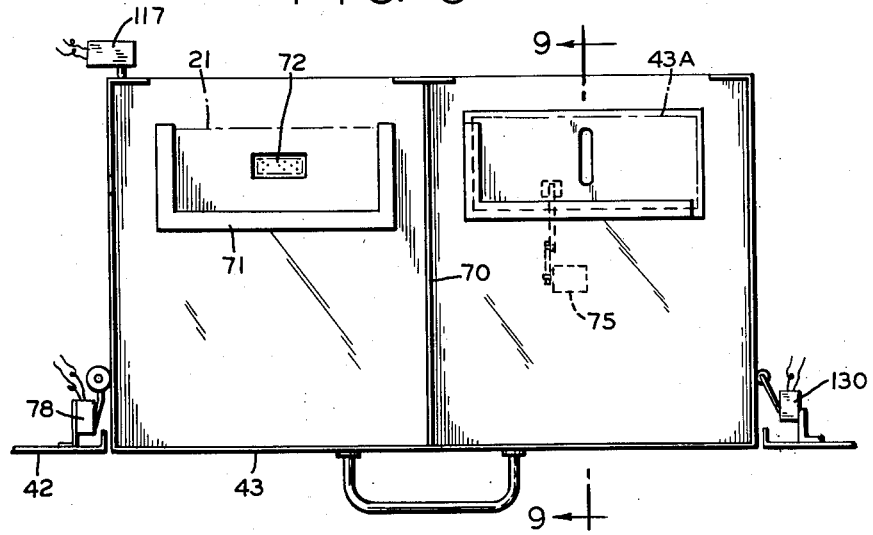
FIGURE 8 is a plan view of the tray.

The details of tray 43 are depicted in more detail in FIGURES 8 and 9. FIGURE 8 is a plan view of the tray when at its innermost (third) position and shows a longitudinal divider strip 70 dividing the left tray half from the right half. On the left tray half there is mounted a three-sided frame 71 which positions the identification means 21. An aperture 72 on the tray is located so as to be disposed directly underneath of space 23 of the identification means, thereby permitting the subscriber identification means to become illuminated by illumination means 57A disposed underneath and sensed by the right half portion of photoelectric means 60 (see FIGURES 5 and 6) disposed above the tray. The signal developed in the right portion of photoelectric means 60 is then compared with the signal in the left portion, the latter being responsive to the code on the receptacle. When both halves receive coinciding signals, further operation of the apparatus is stopped.

During the entire operation of the apparatus, identification means 21 remain on the left tray half within the confines of frame 71.

On the right portion of the tray there is space for the deposit which is placed on pivotally mounted portion 43A. This portion of the tray normally is in its horizontal position during the time that the tray or acceptance means is in its first and second position. While the tray is, however, in its third position and subsequent to an image of the deposit having been recorded, an electrically operated rotary solenoid 75 mounted on the underside of the tray, actuates by means of linkage 76 the hingedly mounted portion 43A, see FIGURE 9, thereby causing the deposit to be transferred by gravity or other suitable means to storage receptacle 65. Briefly thereafter the rotated tray portion 43A is returned to its horizontal position as the solenoid resumes its original position.

While the tray is still in its third position, that is farthest within the apparatus and after the deposit has been transferred to storage, one or more exchange articles 35 are placed on the right portion of the tray. Moreover, as the right portion of the tray is in view of the image recording means 61, an image of the exchange article ejected from magazine 31 is made, this recording action supplementing the record of the deposit since the deposit previously occupied the same position on the tray.

Switch 67 mounted on the apparatus cabinet senses the presence or absence of a deposit and a similar switch 78 engaging the side of the tray is provided for circuit resetting purposes. Switch 117 senses that the tray is in the third position and will be described in conjunction with the schematic circuit diagrams. Switch 130 is engaged by the tray in the second and third tray position and applies power to various circuit components.

Figure 10:
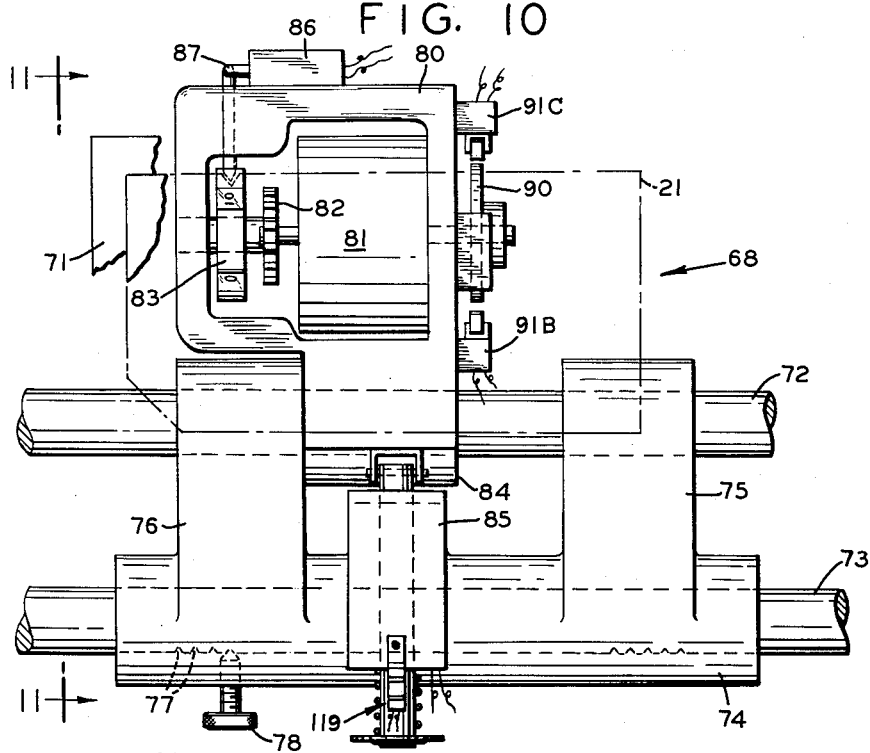
FIGURE 10 is a plan view of the stamping and notching means including the sensing means which sense the validity of the identification means for the prevailing time interval.
Figure 11:
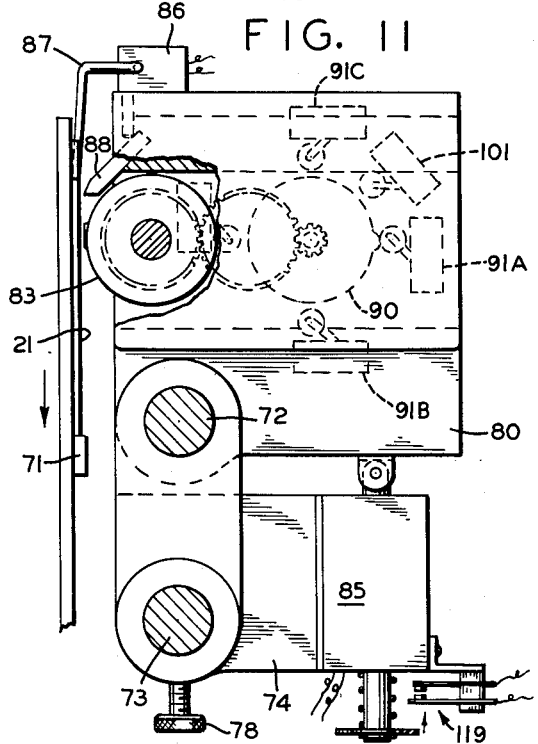
FIGURE 11 is a view along line 11—11 of FIGURE 10.

The means for sensing the correct time interval and the means for effecting notching and marking of the identification means, their positions being indicated schematically in FIGURE 6 numeral 68, are shown in a more detailed manner in FIGURES 10 and 11, respectively. It will be observed that the sensing marking means, having to do only with the identification means, are positioned to cooperate with the left portion of the tray, FIGURE 8.

In general, the sensing and marking means are mounted on two parallel shafts 72 and 73 which support a casting 74 provided with two extending portions 75 and 76. The entire casting assembly is positionable along shafts 72 and 73. Shaft 73 is provided along a longitudinal portion of its circumference with a plurality of rack type notches 77, each notch being engagable by a positioning screw 78. The casting, therefore, will be positioned longitudinally along the axis of shaft 73, each notch denoting a data corresponding to the margins 24 on the identification means, see FIGURE 2. In this manner, the casting will be advanced step-by-step corresponding to the time increments provided on the identification means. A second casting 80 sliding on shaft 72 supports a drive motor 81 which drives via gear reduction means 82 a printing wheel 83. Castings 80 and 74 are coupled to one another by means of a bifurcated extension 84 to which there is coupled a solenoid 85, the latter being attached to casting 74.

As casting 74 with adjusting screw 78 is positioned along shaft 73 for adjustment of the respective time interval, sensing switch 86 mounted on casting 80 is carried along. This sensing switch is fitted with a sensing arm 87 adapted to sense the outer edge of margin 24. When this sensing arm feels the absence of a notch 25, FIGURE 2, the switch establishes that the identification means is valid for the current time period, not having been notched. The presence of a notch will indicate, however, that the identification means is not valid for the current time interval as adjusted by the setting of casting 74 and screw 78 with respect to the position of the identification means. FIGURES 10 and 11 show the identification means 21 properly positioned relative to the sensing arm 87.

A cutting knife, or suitable notching means, 88 is attached to casting 80 to cause a notch within margin 24 of the identification means when the apparatus has been actuated so as to prevent repeated use of the identification means within the same period of time. Simultaneously, when the notching occurs, printing wheel 83 which has been positioned by motor 81 to the proper rotational position effects imprinting upon space 26 at a location opposite the notching. Both operations, notching and imprinting, are accomplished by energizing solenoid 85 supported on casting 74 thereby causing casting 80 to rock about the axis of shaft 72. This motion brings the printing wheel 83, and the notching means 88, into intimate contact with the identification means disposed underneath. Switch 119 located at the rear of solenoid 85 is actuated at the end of the stroke of the plunger of solenoid 85, the purpose of this switch will be evident later.

The amount of rotation of motor 81 is directly related to the rotational position of printing wheel 83 which is adapted to imprint varying amounts of quantities of the exchange article onto the identification means. It will be apparent that these quantities in turn are related to the length of time that motor 37 (FIGURE 3) must operate in order to dispense the selected number of articles 35 from the magazine 31. To accomplish this task, a cam 90 is coupled by suitable gears to motor 81. About the circumference of the cam there is disposed, depending upon the number of selections available to the subscriber, a plurality of switches 91A, 91B, 91C, etc. In the instant embodiment four switches 91A through 91D are positioned about the cam in order to achieve three selections, namely $10.00, $20.00 and $30.00, respectively. A further switch, numeral 101, engaged by cam 90 causes operation of rotary solenoid 75 for storing the deposit.

The electrical circuit for operating motor 37 in response to the selection from the front panel of the apparatus in conjunction with positioning of cam 90 is shown in conjunction with the electrical circuit diagrams.

FIGURES 12 and 13 are schematic electrical circuit diagrams for explaining the coaction and sequencing of the various components.

*First position.*—When tray 43 is at its first position, see FIGURE 1, the identification means and a deposit are placed on the tray. The depositor using the apparatus is required to depress the proper "Select Exchange Article" switch 51, andt hereafter move tray 43 rearward until stopped by solenoid actuated plunger 55 at the tray's second position, see FIGURE 6.

*Second position.*—Switch 67 (FIGURES 7 and 13) senses the presence of deposit 66 on the tray 43. Voltage is applied to switch 67 via switch 130 (FIGURE 8) which is actuated by tray 43 when moved from the first position. If a deposit is missing, lamps 46 and 47 become energized. If a deposit is present, voltage is applied across switch 48 which must be manually depressed to check validity of the identification means. Closing of switch 48 starts motor 58 and rotates associated cams 102, 103, 104 and 115. Cam 102 and switch 105 cause the motor to operate for one revolution and stop. Switch 105 also applies during this period electric energy to illumination means 57 and 57A to provide illumination to photoelectric sensing means 60. As receptacle 56 rotates, the code cards 56A are compared with the subscriber's identity code on the identification means 21 by means of dual photoelectric sensing banks 60, conventional thyratron lock-in circuits 108 and 109 connected thereto, and decoding relays 110 and 111. Cam 115 and associated switch are driven by motor 58 through a suitable gear box 116 to reset the thyratron circuit after sensing each of the cards 56A on receptacle 56 has been accomplished. If no coincidence between the code on the identification means and the code on the receptacle 56 is found (and consequent equal signals on thyratrons 108 and 109, and relays 110 and 111, respectively), the account is deemed to be in good condition and relay 112 remains de-energized. A pulse signal provided by cam 104 briefly energizing switch 106 causes actuation of relay 114 which locks in via closed switch 78 (closed by position of tray when tray is at second and third position, FIGURE 8). Closed relay 114 energizes lamp 49 ("Push Tray In") and stop solenoid 55 (FIGURES 6 and 7), thereby allowing the tray now to be advanced to the third position.

If there is found coincidence between the two identification codes, or if the position on the receptacle receiving the identification means 21 is blank, indicating absence of an identification means, then relay 112 becomes energized and relay 113 operated which locks-in through closed switch 78. An associated contact on relay 113 energizes lamp 47 ("Withdraw Tray") and lamp 44 ("No Identification or Invalid Identification").

The connections between photoelectric means and thyratron tubes are well known in the art, particularly the energizing of a thyratron in response to a signal from a photoelectric cell. The thyratrons are then connected to so-called "Transfer Tree Circuits" as are equally well known in the art of relays, see "The Design of Switching Circuits" by Wm. Keister et al. (book) D. Van Nostrand Company, Inc., New York 1951, particularly p. 50 et seq. A signal is developed and sent to relay 112 only in the event that the output from the two tree circuits 110 and 111 is equal.

*Third position.*—As the tray is moved to the third position, switch 78 is momentarily operated by an aperture 43B in the side wall of tray 43 (FIGURE 9) thus unlocking relay 114.

In the third position, closed switch 117 (FIGURES 8 and 12) permits switch 86 via switch arm 87 to sense the existence of a notch 25 in the marginal space 24 of identification means 21. If a notch is present, lamps 45 and 47 become energized—"Identification Means Invalid Today—Withdraw Tray." In the event that the card is not notched, switch 86 is operated applying voltage to motor 81 via one of the interlocking-type selector switches 51 ("Select Exchange Article") and via one of the switches 91C, 91D or 91B located about the circumference of cam 90. Motor 81 rotates cam 90 and stamp or printing wheel 83 in counterclockwise direction until the position of the switch associated with push button 51 is reached at which point the motor stops and the voltage is switched to operate solenoid 150 to reset buttons 51 and this voltage also actuates solenoid 85, the notching and printing means shown in FIGURE 11. At the end of the stroke of the plunger of solenoid 85, switch 119 (FIGURE 11) is actuated, causing relay 120 to become energized, the latter locking in through its lowermost contact and switch 91A. Motor 81 now returns cam 90 to its "home" position which is reached when switch 91A becomes operated at which time cam 90 shuts off the motor by opening the circuit through switch 91A.

Cam 122 and switch 123 are operated by motor 37 (exchange article dispensing motor) which is connected in parallel and operates in synchronism with motor 81. Cam 122 is provided with circumferential projections whose relative position is the same as the position of switches 91C, 91D and 91B about cam 90. In addition, there is a projection just prior to the relative position that switch 101 occupies about cam 90.

As the motors rotate, the first projection on cam 122 closes switch 123 and causes recording means 61 to record an image of the deposit. Immediately thereafter, rotary solenoid 75 is actuated by switch 101 disposed about cam 90, thus causing the deposit to be transferred to receptacle 65. Then in synchronism, exchange articles are ejected by feed rollers 39 and 40 and an image of each article recorded by virtue of the coaction between switch 123 and cam 122.

When relay 120 is energized as noted above, relay 125 in turn becomes actuated to remove voltage from switch 123 to stop further operation of the recording means. As lamps 47 and 50 become energized, solenoid clutch 124 disconnects the article feed means and the film drive during the homing process of motors 81 and 121. Thus the entire circuit is reset. The subscriber now is advised to return the tray to the first position for removal of the identification means and of the exchange article.

Although the above description sets forth most of the important and salient features, several additions or modifications are readily possible. For instance, the subscriber identification means and the portion of the tray receiving the identification means can be equipped with complementary engaging means, such as adjustable pins and corresponding apertures, notchings, etc., to provide additional coding establishing the time period during which the respective identification means are valid, e.g., the month of March, 1959, depicted in FIGURE 2. If desirable, more complex coding means may be employed such as photoelectric sensing means, magnetic spots, etc., which are sensed to establish the month and year. In this manner a subscriber will be prevented from using outdated identification means.

One further modification which is readily available concerns the checking of the validity of the subscriber's identity at a central location which is connected to one or more of the instant apparatus by telephone wires, coaxial cables, etc. A storage receptacle of the type indicated in FIGURES 5 and 6, numeral 56, will be located at a central office and electrical signals between the apparatus and the central location transmit the necessary information to either render the apparatus operative or inoperative depending upon the verification of the subscriber's account. In this manner, a much larger file of accounts can be maintained on a current basis. If desired, the same transmitting lines may be used for accounting purposes, to report to the central office withdrawals by subscribers, to establish the condition of the apparatus and to perform such other functions as may be appropriate.

Furthermore, instead of photographic camera means, numeral 61, it will be apparent that other well known image recording means such as photoelectric scanning and reading means with magnetic tape storage, etc., may be substituted.

A still further modification concerns the positioning of the image recording means in such a manner that a photographic record is made of the identification means together with the deposit and together with the exchange article, respectively.

While there has been described a certain embodiment of the present invention, it will be apparent to those skilled in the art that various other changes and modifications may be made therein without deviating from the spirit and intent of the present invention which shall be limited only by the scope of the appended claims.

What is claimed is:

1. In a subscriber controlled apparatus the combination of a subscriber identification means; said means being disposed normally outside of said apparatus and being provided with a first code means and a second code means, each establishing the validity of the identification means; receiving means disposed on said apparatus adapted to receive the identification means for insertion into the apparatus; a receptacle in said apparatus; said receptacle adapted to be provided with code means; sensing means disposed in said apparatus for comparing the code means in said receptacle with the first code means of the identification means when the latter is inserted in the apparatus; sensing means disposed in said apparatus for sensing the validity of said second code means provided on said identification means whereby to determine the validity of the second code means; means causing the apparatus to be operative in response to the validity of said identification means as determined by the operation of said sensing means, and means disposed on the apparatus adapted to engage the identification means for modifying one of said code means in response to the apparatus having been rendered operative.

2. In a subscriber controlled apparatus the combination of: a subscribed identification card; said card being disposed normally outside of said apparatus and being provided with first data identifying the subscriber and second data establishing the validity of the card for a specified period of time; receiving means disposed on said apparatus adapted to receive the card for insertion into the apparatus; a receptacle in said apparatus; said receptacle adapted to be provided with subscriber identifying data; sensing means disposed in said apparatus for comparing the data in said receptacle with the first data appearing on the subscriber's card inserted into the apparatus whereby to determine validity of said identification card with respect to the subscriber; further sensing means disposed in said apparatus for sensing the validity of said second data provided on said card whereby to determine the validity of the identification card for the specified period of time; means causing the apparatus to be operative in response to the validity of said card with respect to the subscriber and period of time as determined by the operation of the sensing means, and means disposed in said apparatus adapted to engage the card for modifying said second data when the apparatus has been rendered operative to prevent recurring operation of the apparatus in combination with the modified card during the same specified period of time.

3. In a subscriber controlled apparatus the combination of: a subscriber identification card; said card being disposed normally outside of said apparatus and being provided with a first set of data and a second set of data, each establishing validity of the card; receiving means disposed on said apparatus adapted to receive the card for insertion into the apparatus; a receptacle in said apparatus; said receptacle adapted to be provided with a plurality of data; sensing means disposed in said apparatus for comparing the data in said receptacle with the first set of data appearing on the subscriber identification card when the latter is inserted into the apparatus; a further sensing means disposed within said apparatus for sensing the validity of said second set of data provided on said card whereby to determine the validity of the second data for a specified period of time; means causing the apparatus to be operative in response to the validity of said first and second set of data as determined by the operation of said sensing means; means disposed on the apparatus and adapted to engage the card for modifying said second data when the apparatus has been rendered operative to prevent operation of the apparatus in combination with the modified card during the same specified period of time, and means for periodically altering the setting of said further sensing means of said apparatus to cause the sensing means to sense validity of the card for a different period of time.

4. In a subscriber controlled apparatus the combination of: a subscriber identification card; said card being disposed normally outside of said apparatus and being provided with first data identifying the subscriber and second data for establishing the validity of the card for a specified period of time; said second data comprising a plurality of margins, each margin denoting a specified period of time; receiving means disposed on said apparatus for receiving the card and inserting the card into the apparatus; a receptacle in said apparatus; said receptacle adapted to be provided with a plurality of subscriber identifying data; sensing means disposed in the apparatus for scanning the data in said receptacle and comparing them with the first data appearing on the subscriber's card inserted into the apparatus thereby determining the validity of the card with respect to the subscriber; further sensing means disposed in the apparatus; said further sensing means adapted to coact with one of the margins on the card to determine the validity of the identification card for the period during which the card is within the apparatus; means causing the apparatus to be operative in response to the validity of said card as determined by the operation of said sensing means; means disposed on the apparatus adapted to engage the card and adapted to be actuated in response to the apparatus having been rendered operative for modifying the second data with respect to the period specified by altering the margin which denotes period of validity, whereby preventing subsequent operation of the apparatus in response to insertion of the said card into the apparatus during the same specified period, and means disposed in the apparatus for periodically altering the setting of the said further sensing means to cause the sensing means to sense another one of said plurality of margins on said identification card.

5. In a subscriber controlled apparatus the combination of: an enclosure having therein an aperture for receiving an identification means which is normally disposed outside of said apparatus; said identification means being provided with a first code means identifying the subscriber and a second code means establishing the validity of said identification means for a specified period of time; a receptacle disposed in said enclosure which is adapted to contain code means which are correlatable with the first code means of said identification means; sensing means in said enclosure sensing said first and second code means on said identification means and comparing said first code means with the code means in said receptacle thereby determining validity of said identification means; means connected to said sensing means for rendering said apparatus operative upon the sensing means having established the validity of said identification means, and means operative upon said identification means when said identification means has been found valid for preventing the said identification means to render the apparatus operative again during the same time interval as determined by said second code means.

6. In a subscriber controlled apparatus the combination of: a subscriber identification means; said means being disposed normally outside of said apparatus and being provided with a first code means identifying the subscriber and a second code means establishing validity of said identification means for a specified period of time; receiving means disposed on said apparatus adapted to receive a deposit and the identification means and transfer the deposit and the identification means into said apparatus; a receptacle disposed in said apparatus adapted to retain a plurality of code means selectively correlatable with the first code means on the identification means; sensing means disposed in said apparatus for sensing the code means in said receptacle and the first code means on said identification means when the latter has been transferred into the apparatus to determine the validity of the identification means with respect to the subscriber; image recording means disposed for recording an image of said deposit transferred into the apparatus; control means actuating said recording means in response to the receipt of the deposit whereby to produce a documentary record of said deposit; a storage chamber within said apparatus; means transferring said deposit from the receiving means to the storage chamber subsequent to an image of said deposit having been recorded; sensing means in said apparatus for sensing said second code means disposed on said identification means whereby to determine the validity of the identification means for a specified period of time; means storing an exchange article within said apparatus; means releasing said exchange article from the storage means in response to the sensing means having sensed said first and second code means and determined the validity of the identification means with regard to the subscriber and specified period; image recording means disposed to record an image of the exchange article; control means actuating the recording means in response to the release of said exchange article whereby to provide a documentary record of the exchange article, and means disposed in said apparatus adapted to modify said second code means in response to the sensing means having established the validity of said identification means, whereby to prevent recurring release of an exchange article from the apparatus when the same identification means is received again by said receiving means during the same specified period of time.

7. In a subscriber controlled apparatus the combination of: a subscriber identification means normally disposed outside of said apparatus; said means provided with code means arranged in a manner to denote a plurality of predetermined divisions and each division when valid adapted to cause issuance of at least one article from the apparatus; receiving means disposed on said apparatus adapted to receive the identification means and insert it into said apparatus; sensing means disposed in said apparatus; said sensing means adapted to selectively determine the validity of said divisions when said identification means is disposed in said apparatus; an article stored in the apparatus; means releasing the article from storage in the apparatus to a position accessible from the exterior of the apparatus in response to said sensing means having determined the validity of a selected division, and means coacting with said identification means while said identification means is disposed in said apparatus and in response to the release of the article for modifying the selected division while leaving unimpaired non-selected divisions, thereby rendering the identification means invalid when the identical division is sensed subsequently by said sensing means.

8. In a subscriber controlled apparatus the combination of: a subscriber identification means normally disposed outside of said apparatus; said means provided with code means arranged in a manner to denote a plurality of predetermined divisions and each division when valid adapted to cause issuance of at least one article from the apparatus; receiving means disposed on said apparatus to receive the identification means and insert it into said apparatus; sensing means disposed in said apparatus; said sensing means adapted to selectively determine the validity of said divisions when said identification means is disposed within said apparatus; storage means in the apparatus adapted to contain a plurality of articles; means releasing at least one of the articles from storage in the apparatus to a position accessible from the exterior of the apparatus in response to said sensing means having determined the validity of a selected division, and means coacting with said identification means while said identification means is disposed in said apparatus and when the release of an article is caused to render the selected division invalid while leaving unimpaired the validity of remaining divisions, thereby enabling further use of the identification means to cause the release of another article from the storage means when a still valid division is sensed by said sensing means.

9. In a subscriber controlled apparatus the combination of: a subscriber means; said means being disposed normally outside of said apparatus and being provided with code means denoting a plurality of divisions of time during which the identification means is valid; receiving means disposed on said apparatus adapted to receive the identification means and insert it into said apparatus; time division responsive sensing means disposed in said apparatus and said sensing means being adjustable for sensing on said identification means a predetermined division which is related to the prevailing time interval; control means coacting with said sensing means for determining the validity of said identification means when the latter means is disposed in said apparatus; an article stored in said machine; means releasing the article from storage in response to said sensing means having sensed the division related to the prevailing time interval and said control means having determined the division to be valid, and means coacting said said code means of the identification means when the latter is disposed in the apparatus for rendering the respective division invalid while leaving unimpaired the validity of divisions related to future time intervals.

10. In a subscriber controlled apparatus including image recording means the combination of: a subscriber identification means normally disposed outside of said apparatus; said means provided with code means arranged in a manner to denote a plurality of predetermined divisions; each division being related to a time interval and when valid permitting the issuance of at least one exchange article from the apparatus; receiving means disposed on said apparatus adapted to receive for insertion into the apparatus a deposit and the identification means; sensing means disposed in said apparatus; said sensing means adapted to selectively determine the validity of said divisions when said identification means is disposed in said apparatus; an exchange article stored in the apparatus; means releasing the exchange article from the apparatus in response to the receipt of said deposit and said sensing means having determined validity of a selected division; means disposed in said apparatus for engaging said identification means while the latter is in the apparatus to render the identification means invalid by modifying the selected division while leaving unimpaired the validity of divisions related to future time intervals; said image recording means disposed to view the deposit and said released exchange article, and control means actuating said recording means in response to the receipt of the deposit and the sensing means having determined the validity of the selected division whereby to produce a documentary record of said deposit and of the released exchange article.

11. In a subscriber controlled apparatus the combination of: a subscriber identification means normally disposed outside of said apparatus: said identification means provided with a first code means identifying the subscriber and being provided also with a second code means arranged in a manner to denote a plurality of predetermined divisions, each division when valid enabling operation of the apparatus; a receptacle disposed in said apparatus which is adapted to contain a plurality of subscriber identifying codes which are correlatable with respective first code means on the subscriber identification means; means on said apparatus for bringing said identification means into engagement with said apparatus; sensing means in said apparatus for sensing said first code means and determining correlation between said first code means on said engaged identification means and one of the codes in said receptacle whereby to determine validity of the identification means with regard to the subscriber; further sensing means disposed in said apparatus adapted to determine the validity of a predetermined division on said engaged identification means; at least one article stored for release in the apparatus; means operatively connected to said sensing means for rendering the apparatus operative whereby to release said exchange article from storage in the apparatus in response to the sensing means having established the validity of the subscriber identification means as determined by the status of correlation between said first code means of the identification means and the code contained in the receptacle, and in response to the further sensing means having established the validity of a predetermined division on the engaged identification means, and means disposed in the apparatus for acting upon the engaged identification means for rendering the predetermined division invalid in response to the release of the exchange article to prevent operation of the apparatus when the same subscriber identification means is re-engaged by said apparatus and said further sensing means sense the identical division.

12. In a subscriber controlled apparatus including image recording means the combination of: a subscriber identification means normally disposed outside of said apparatus; said means provided with code means arranged in a manner to denote a plurality of predetermined divisions and each division when valid adapted to cause issuance of an exchange article from the apparatus; receiving means disposed on said apparatus adapted to receive for insertion into the apparatus a deposit and the identification means; sensing means disposed in said apparatus; said sensing means adapted to determine the validity of said inserted identification means by sensing a selected division; an exchange article stored in the apparatus; means releasing the exchange article from the apparatus in response to the receipt of said deposit and said sensing means having established the validity of a selected division on said identification means; means disposed in said apparatus for engaging said identification means and for rendering the identification means invalid to prevent further release of exchange articles by modifying the division determined to be valid yet leaving unimpaired other divisions; means releasing the modified identification means to the subscriber while retaining the deposit; said image recording means disposed for viewing said deposit and said released exchange article, and control means actuating said recording means in response to the sensing means having established validity of said identification means thereby providing documentary evidence of the deposit and released exchange article.

13. In a subscriber controlled apparatus as set forth in claim 8 wherein mutilating means are provided to render the sensed division invalid.

14. In a subscriber controlled apparatus the combination of: a subscriber identification means normally disposed outside of said apparatus; said means provided with code means arranged in a manner to denote a plurality of predetermined divisions and each division when valid adapted to cause the issuance of an exchange article from the apparatus; receiving means disposed on said apparatus adapted to receive for insertion into said apparatus a deposite and the identification means; sensing means disposed in said apparatus; said sensing means adapted to determine the validity of said identification means by sensing a selected division thereof when the identification means is disposed within said apparatus; an exchange article stored in the apparatus; means rendering the deposit inaccessible for surreptitious removal and releasing the exchange article from the apparatus in response to the receipt of said deposit and said sensing means having established the validity of a selected division on said identification means, and means disposed in said apparatus for engaging said identification means and for rendering the identification means invalid by modifying the selected division while leaving unimpaired the validity of the identification means when a non-modified division is sensed.

15. In a subscriber controlled apparatus the combination of: a subscriber identification means; said means being disposed normally outside of said apparatus and being provided with a first code means identifying the subscriber and a second code means establishing validity of said identification means for a specified period of time; receiving means disposed on said apparatus adapted to receive a deposit and the identification means and transfer the deposit and identification means into said apparatus; a receptacle disposed in said apparatus adapted to retain a plurlity of code means selectively correlatable with the first code means on the identification means; sensing means disposed in said apparatus for sensing the code means in said receptacle and the first code means on said identification means when the latter has been transferred into the apparatus to determine the validity of the identification means with respect to the subscriber; a storage chamber within said apparatus for storing said deposit; sensing means in said apparatus sensing said second code means disposed on said identification means whereby to determine the validity of the identification means for the specified period of time; means storing an exchange article in said apparatus; means transferring said deposit from the receiving means to the storage chamber and releasing said exchange article from the storage means to a position accessible from the exterior of the apparatus in response to the sensing means having sensed said first and second code means and determined the validity of the identification means with regard to the subscriber and specified period; further means disposed in said apparatus and adapted to modify said second code means in response to the sensing means having established the validity of said identification means to prevent recurring release of exchange articles during the same period of time when the same identification means is inserted into the apparatus, and adjusting means for varying the sensing means which sense the second code means on said identification means to enable release of an exchange article when a different specified period of time is reached and the identification means is re-inserted into the apparatus.

References Cited in the file of this patent

UNITED STATES PATENTS

| | | |
|---|---|---|
| 1,925,199 | Mills | Sept. 5, 1933 |
| 2,073,904 | Osteen | Mar. 16, 1937 |
| 2,659,470 | DuPont | Nov. 17, 1953 |
| 2,699,100 | Simjian | Jan. 11, 1955 |
| 2,717,069 | Driscoll | Sept. 6, 1955 |
| 2,754,496 | Embry | July 10, 1956 |
| 2,783,865 | Cleave | Mar. 5, 1957 |
| 2,792,148 | Goldenberg | May 14, 1957 |
| 2,906,505 | Orr | Sept. 29, 1959 |